(12) United States Patent
Einloth et al.

(10) Patent No.: US 7,809,936 B2
(45) Date of Patent: Oct. 5, 2010

(54) METHOD AND APPARATUS FOR RECONFIGURING A REMOTE DEVICE

(75) Inventors: Brian W. Einloth, Grayslake, IL (US); Michael J. McClaughry, Lake Barrington, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 420 days.

(21) Appl. No.: 11/461,811

(22) Filed: Aug. 2, 2006

(65) Prior Publication Data
US 2008/0051075 A1    Feb. 28, 2008

(51) Int. Cl.
*G06F 1/24* (2006.01)
*G06F 9/00* (2006.01)
*G06F 13/00* (2006.01)
*G06F 15/177* (2006.01)
*G06F 9/45* (2006.01)

(52) U.S. Cl. .................. 713/100; 713/1; 710/104; 709/221; 703/22

(58) Field of Classification Search ............ 713/100, 713/1; 703/22; 709/221; 710/104
See application file for complete search history.

(56) References Cited

U.S. PATENT DOCUMENTS

| | | | |
|---|---|---|---|
| 5,930,704 A | | 7/1999 | Kay |
| 6,615,255 B1 * | | 9/2003 | Blaszczak ............ 709/220 |
| 6,634,017 B2 * | | 10/2003 | Matsui et al. ............ 716/11 |
| 6,954,634 B1 * | | 10/2005 | Bucknell et al. ........... 455/418 |
| 7,412,696 B2 * | | 8/2008 | Matsuyama ............... 717/137 |

(Continued)

FOREIGN PATENT DOCUMENTS

WO    WO 02/08936 A2    1/2002

OTHER PUBLICATIONS

Vahid, Frank; Self-Improving Configurable IC Platforms; Department of Computer Science and Engineering, University of California; from www.cs.ucr.edu/~vahid; SRC Annual Review Talk, Feb. 2003, pp. 1-18.
Stitt, Greg et al.; Dynamic Hardware/Software Partitioning: A First Approach; Department of Computer Science and Engineering, University of California; DAC 2003; Jun. 2003; pp. 1-6.

*Primary Examiner*—Stefan Stoynov
(74) *Attorney, Agent, or Firm*—Vedder Price P.C.

(57) ABSTRACT

A system (100) for reconfiguring a remote device (102) (e.g., a client device) that includes at least one processor (200) and reconfigurable logic (202) that is operatively coupled to the processor (200), employs for example, a network element that serves as a remote profile server (104) for the remote device (102). The remote device (102) includes an application profiler (206) that produces application runtime profile statistic information (120) during runtime of an application running on at least one processor (200) of the device. The remote profile server (104) includes a profile analyzer (130) that analyzes the received application runtime profile statistic information (120) to determine suitable reconfigurable logic configuration information (122) and corresponding application patch information (124) for the remote device (102). The remote profile server (104) then sends the reconfiguration logic configuration information (122) and corresponding application patch information (124) back to the remote device (102). The remote device (102) then utilizes the information to reconfigure its onboard reconfigurable logic (202) and to also utilizes the corresponding application patch (124). Corresponding methods are also described.

23 Claims, 4 Drawing Sheets

U.S. PATENT DOCUMENTS

| | | |
|---|---|---|
| 2003/0061409 A1 | 3/2003 | RuDusky |
| 2004/0098715 A1* | 5/2004 | Aghera et al. ............... 717/173 |
| 2005/0144523 A1 | 6/2005 | Sierer et al. |
| 2006/0106806 A1* | 5/2006 | Sperling et al. ............... 707/10 |
| 2007/0150524 A1* | 6/2007 | Eker et al. .................. 707/203 |
| 2008/0282263 A1* | 11/2008 | Song et al. .................. 719/318 |

* cited by examiner

METHOD AND APPARATUS FOR RECONFIGURING A REMOTE DEVICE

FIELD OF THE INVENTION

The invention relates generally to methods and apparatus for reconfiguring devices that employ reconfigurable logic, and more particularly to methods and apparatus that profile applications to determine how to reconfigure reconfigurable logic on a device.

BACKGROUND OF THE INVENTION

Devices are known that employ, for example, processing devices (e.g., microprocessors, CPUs, ASICs, etc.) that are coupled to reconfigurable logic such as field programmable gate arrays. Such devices may include, for example, cell phones, digital video players, digital music players, and combination thereof, or any portable or non-portable device. For example, it may be desirable to have reconfigurable logic, such as a field programmable gate array perform certain operations of the device and leave the microprocessor or other processing device to perform other processes. Typically the processor executes applications and the reconfigurable logic may perform functions that may be complimentary to or supplemental to operations carried out by the processor, for example.

Profiling of hardware and/or software is a known technique used to measure performance. Devices and methods are known that utilize hardware and/or software to perform this profiling. It also is known that, for example, one integrated circuit may be used to profile an application that is executing on another integrated circuit, such as a processor that is coupled to a field programmable gate array, as mentioned above. The integrated circuits may be on the same die if desired or the profiling may be performed by a software application executing on the processor running the application. In general, profiling is utilized to determine the performance of the application with the goal to improve this performance by some means. In the example above, the profiler is typically profiling an application that is running on the processor to see whether or not the reconfigurable logic can be reprogrammed to enhance the operation of the device. For example, such a device could perform on-chip profiling by profiling an application using the device processor, or by using dedicated on-chip profiling hardware. However, handheld devices or portable devices can also have limited on-chip resources, for example computing power, to carry out the analysis of the gathered profile information and to carry out the design of a reconfiguration for the reconfigurable logic that will improve the performance of the profiled application. In addition, employing on-chip profiling analysis and accelerator design can increase the cost of a chip since it needs to have these capabilities onboard even though they are used only infrequently. Finally, limiting the computing power can limit the range of alternatives that can be employed to reconfigure the reconfiguration logic that is coupled to the processor that is performing the on-chip profiling.

In other devices, it is known to utilize a repository of predefined field programmable gate array configurations to reconfigure field programmable gate arrays in a device. However, such remote repositories do not typically employ any configuration information that is based on application profiling information that is obtained, for example, while an application is running on a processor on the device.

It would be desirable to have a system, method or apparatus that addresses one or more of the above drawbacks.

BRIEF DESCRIPTION OF THE DRAWINGS

The invention will be more readily understood in view of the following description when accompanied by the below figures and wherein like reference numerals represent like elements.

DETAILED DESCRIPTION OF THE PREFERRED EMBODIMENT

Briefly, a system for reconfiguring a remote device (e.g., a client device) that includes at least one processor and reconfigurable logic that is operatively coupled to the processor, employs for example, a network element that serves as a remote profile server for the remote device. The remote device includes an application profiler that produces application runtime profile statistic information during runtime of an application running on at least one processor of the device. The device includes a transceiver that sends the application runtime profile statistic information to the remote profile server. The remote profile server includes a profiling analyzer that analyzes the received application runtime profile statistic information to determine suitable reconfigurable logic configuration information and corresponding application patch information for the remote device. The remote profile server then sends the reconfiguration logic configuration information and corresponding application patch information back to the remote device. The remote device then utilizes the information to reconfigure its onboard reconfigurable logic and to also utilize the corresponding application patch to modify the application from which the profile information was obtained, thereby enhancing the operation of the remote device, such as by reducing power consumption of the remote device and/or speeding up the processing speed of a processor in the remote device or any other suitable performance enhancement(s) as desired. Corresponding methods are also described.

As such, a distributed device reconfiguration system is employed that in one example, utilizes a client/server relationship in which the client device has reconfigurable logic and some profile collection capability. The client device communicates the collected application profile information to a remote server in a format and manner that is suitable for transmission. The remote server, in one example, then performs profile analysis, optimization and determines a final updated reconfiguration for the reconfigurable logic and also provides supporting binary patches to the client device. This can allow for multiple application evaluations and solutions to be tested in real time. Applied to a gaming device, a profile of the game may be provided to the remote server so that an enhanced version of the game may be returned by the remote server. The remote server sends instructions for reconfiguring the configurable logic on the client device. As such, device performance improvements can be realized that may include for example, power consumption reduction, enhanced speed of processing, and other enhancements. Other advantages will be recognized by those of ordinary skill in the art.

Figure 1:
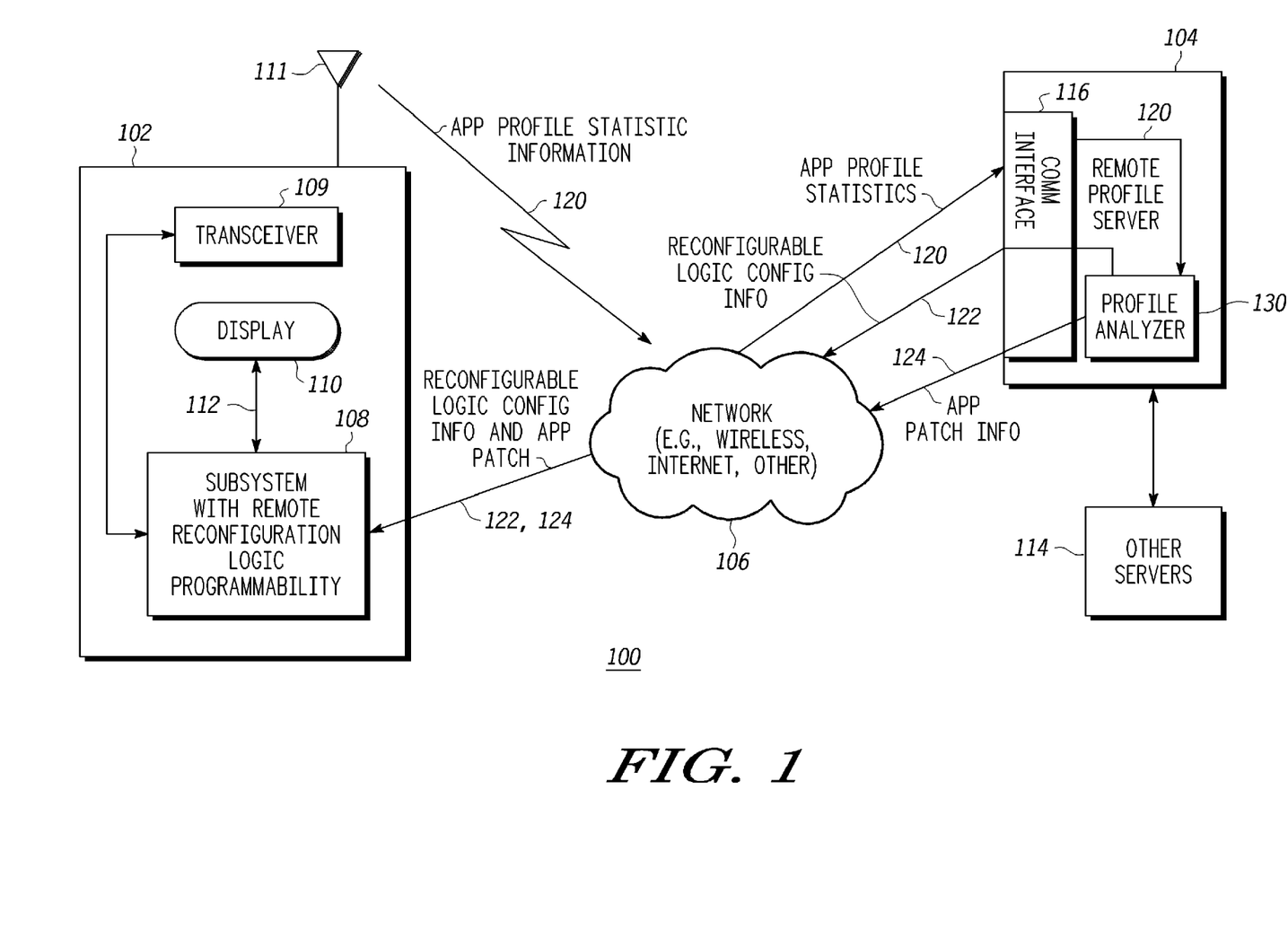
FIG. 1 is a block diagram illustrating one example of a system for reconfiguring a remote device in accordance with one embodiment of the invention.

FIG. 1 illustrates one example of a system 100 that facilitates distributed profile analysis and reconfiguration of reconfigurable logic in accordance with one example of the invention. For purposes of illustration only, and not limitation, the system 100 will be described as a system that employs a device 102 that is in communication with a network element 104 such as a server that is operatively coupled to a wireless transceiver through, for example, a suitable network 106 such as a wireless GSM or UMTS network, or any other suitable network or networks. It will also be recognized that network 106 may be any suitable configuration and may include, for example, the Internet or any other suitable networks. The device 102 may be any suitable device that includes, for example, a subsystem with remote reconfiguration logic programmability 108 which may include, for example, at least one processor that executes executable instructions such as applications, and that includes reconfigurable logic, such as one or more field programmable gate arrays or other suitable reconfigurable logic that is coupled to the processor. Reconfigurable logic can be any set of processing elements in which the connections and the sequence of data movement between the elements is not static, but can change at frequent intervals enabling optimal speed and/or power performance. One way it can differ from a traditional microprocessor executing code is that the data path widths are not fixed, but can be segmented or concatenated to best process the particular application data set. Moreover, connections between processing elements are dynamic, not generally fixed as they are in traditional microprocessors. The complexity of the processing elements can vary widely. For example, in FPGAs, the processing elements are logic gates such as AND or NOR gates. However, they can be more complex elements such as adders, complete arithmetic logic units, or even dedicated accelerator units such as those that are typically used for fast fourier transforms (FFTs) and finite impulse response filters (FIRs). If desired, the device 102 may also include a display 110 operatively coupled to the subsystem 108, through any suitable communication link 112, to display and receive information for a user, if desired.

The device 102 may be any suitable device such as, but not limited to, a handheld gaming device, cell phone, multimedia player or other suitable handheld device that includes any desired functionality such as cell phone communication capability, video playback capability, audio capability, camera capability, or any other suitable capabilities as desired. The device 102 may also be a non-handheld device such as a laptop computer, desktop device, or any other suitable device as desired. The device 102 also includes a communication interface, for example, a wireless transceiver 109 that sends and receives information via an antenna 111 to and from the remote profile server 104 either directly or through a suitable network 106. Device 102 alternatively can communicate directly or through the network 106 to the remote profile server 104 using a non-wireless transceiver.

The remote profile server 104 may be, for example, a web server, non web server or other suitable structure that provides the functions as described herein. As shown, the remote profile server 104 may be coupled to other servers 114 either directly or through other networks so that other servers may also provide portions of the operations described herein to provide a type of distributed remote profile server operation.

The remote profile server 104 also includes a communication interface 116 which may be a transceiver which includes a receiver and transmitter function or may be any other suitable communication interface as known in the art to communicate with the network 104 and/or the device 102 and any other suitable systems or devices as required. The remote profile server 104 may include one or more microprocessors that execute instructions that are stored in associated memory wherein the memory contains executable instructions that cause the one or more processors to carry out the operations described herein such as the profile analyzer 130. Alternatively, the remote profile server may be configured using any suitable combination of hardware, software or firmware as desired.

In operation, and as further described below, the device 102 includes, for example, an application profiler that produces application runtime profile statistic information during runtime of an application that is running on one or more processors within a device, such as a gaming application or any other suitable software application. The application profile statistic information 120 is communicated directly or via any other suitable communication route such as through network 106, to the remote profile server 104. The remote profile server 104 receives the application runtime profile statistic information 120 that is associated with the remote device 102 and analyzes the received application runtime profile statistic information 120 to determine suitable reconfigurable logic configuration information 122 and corresponding application patch information 124 for the remote device 102. The remote profile server 104 sends the reconfiguration logic configuration information and corresponding application patch information for the remote device 102 through the network as desired. In one example, a microprocessor executing suitable instructions, acts as a profile analyzer 130 that analyzes the received application runtime profile statistic information 120 and determines suitable reconfigurable logic configuration information 122 based on the analysis. In the case of an FPGA being available on the client device, the server will generate RTL code, synthesize the design, map the design to the available FPGA, and ensure proper execution by performing timing analysis through circuit simulation. The profile analyzer 130 also generates or obtains corresponding application patch information 124 for the remote device so that the remote device can install the application patch in addition to reconfiguring its onboard reconfiguration logic based on the reconfigurable logic configuration information 122. The communication interface 116 receives and transmits the information as described to facilitate communication between the remote profile server 104 and the device 102.

In addition if desired, there may be additional information sent with the application profile statistic information 120, or as a separate communication if desired, wherein the remote device 102 additionally may communicate resource specification data corresponding to the reconfigurable logic, such as data representing the number of gates available (e.g., 100,000 gates), the amount of tightly coupled memory blocks available in the reconfigurable logic (such as 40 RAM blocks each 1 kb in size) or any other suitable resource specification data needed by the remote server to determine which reconfigurable logic configuration information 122 is suitable for specific types of reconfiguration logic. Alternatively, the remote server may include a database that includes the resource specification data that may be, for example, prestored and the remote devices may, as members of a service, each be assigned a configuration number, for example, that may be communicated so that the remote server can look up the appropriate resource specification data of the reconfigurable logic knowing the type of reconfigurable logic that is present on the remote device. It will be recognized that any other suitable resource specification data or any other communication mechanism may also be employed if desired.

After the remote device 102 sends the application profile statistic information 120, it receives the reconfigurable logic configuration information 122 and application patch information 124 and then reconfigures its onboard reconfigurable logic and also employ the application patch to enhance operation of the device, such as enhancing game playing by, for example, improving performance from the user's perspective, reducing power consumption from the device's perspective, or any other suitable enhancement as desired. It will be recognized that the reconfigurable logic configuration information 122 and application patch information 124 may be in any suitable format including file formats, messaging formats, or any other suitable formats as desired.

Figure 2:
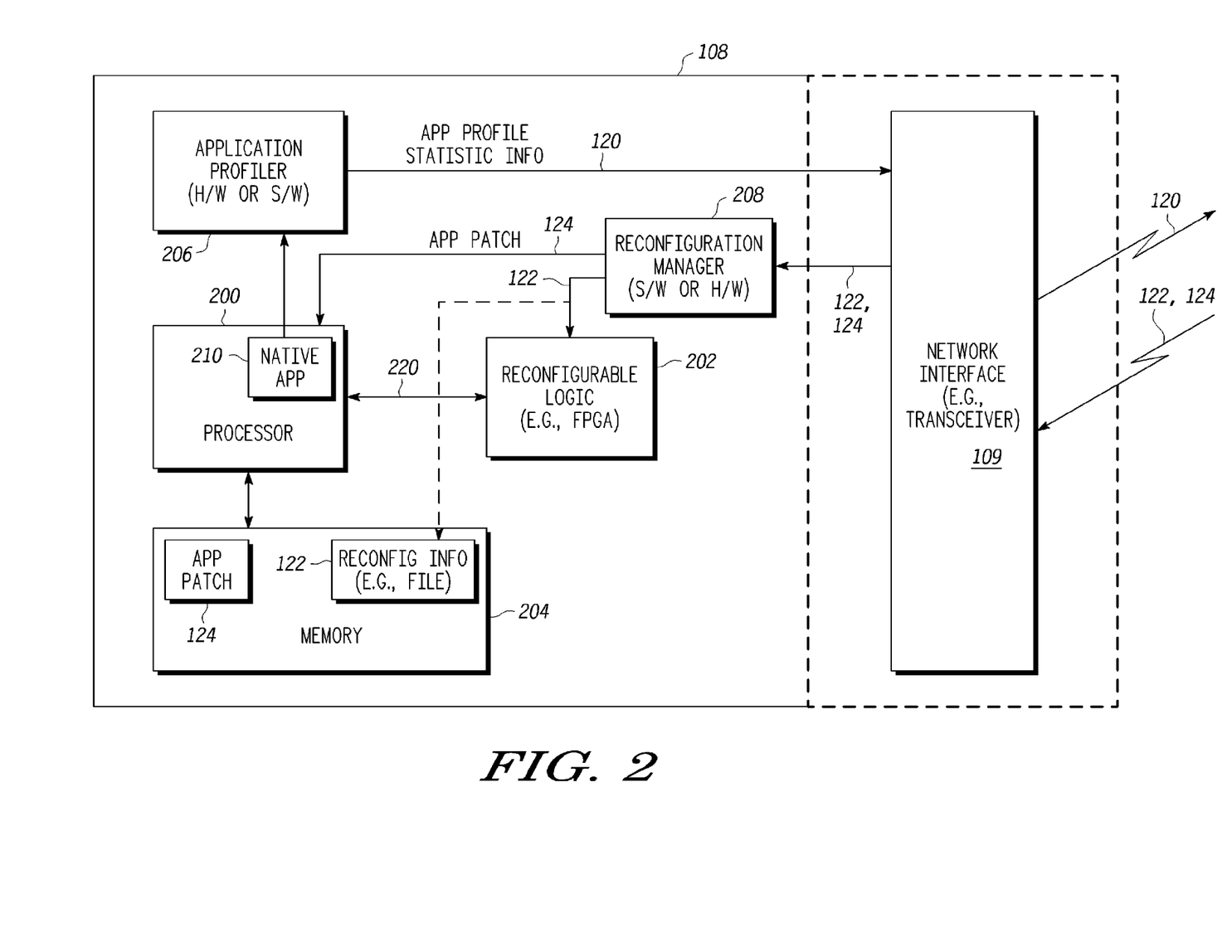
FIG. 2 is a block diagram illustrating one example of a subsystem within a device that provides remote configuration logic programmability in accordance with one embodiment of the invention.

FIG. 2 illustrates one example of a portion of the device 102 that includes the subsystem with remote configuration logic programmability 108. The device 102 is remote from the profile server 104, and includes, for example, at least a processor 200, reconfigurable logic 202 such as a field programmable gate array or any other suitable programmable logic, memory 204, application profiler 206, reconfiguration manager 208 and transceiver 109. The application profiler 206 may be implemented by the processor 200 that executes a software application that provides the functions of the application profiler 206. However, any other suitable implementation may also be utilized. The reconfiguration manger 208 may similarly be executed on the processor 200 as a software application or may be implemented in hardware or any suitable combination of hardware/software/firmware as the application profiler 206. The memory 204 may be any suitable memory whether RAM, ROM, CDROM, optical memory or any other suitable memory whether removable, fixed or distributed throughout other portions of the device and may take any suitable form as desired. The memory 204 contains executable instructions that serve as a native application shown as native application 210 executing on the processor 200. The memory 204 also stores the received reconfiguration logic configuration information 122 and the application patch information 124, in this example.

The application profiler 206 produces the application runtime profile statistic information 120 during runtime of the native application 210 that is running on the processor 200. The obtained statistics may include but are not limited to: number of times particular instructions are executed, number of times particular memory locations or memory location sequences are accessed, number of loop executions, as well as the structure of the loops. These statistics can be gathered by circuits that monitor the instruction and data buses of the executing processor. There are other known methods for acquiring such statistics. The transceiver 109 transmits the application runtime profile statistic information 120 for the remote profile server 104 and as such, may communicate the information directly to the profile server 104 through a third party server or any other routing mechanism as desired. The transceiver 109 also receives the reconfigurable logic configuration information 122 and the corresponding application patch information 124 sent by the remote profile server 104. The reconfiguration manager 208 manages the reconfiguration of the reconfiguration logic 202 based on the reconfigurable logic configuration information 122 which may be stored in the memory 122 in the form of a file when it is received by the transceiver 109. Reconfiguration manager 208 also routes the application patch 124 to the processor so that the processor 200 can simply integrate the application patch to enhance the operation of the device. The reconfigurable logic 202 is operably coupled to the processor through any suitable communication link or links generally shown as 220 as known in the art.

Figure 3:
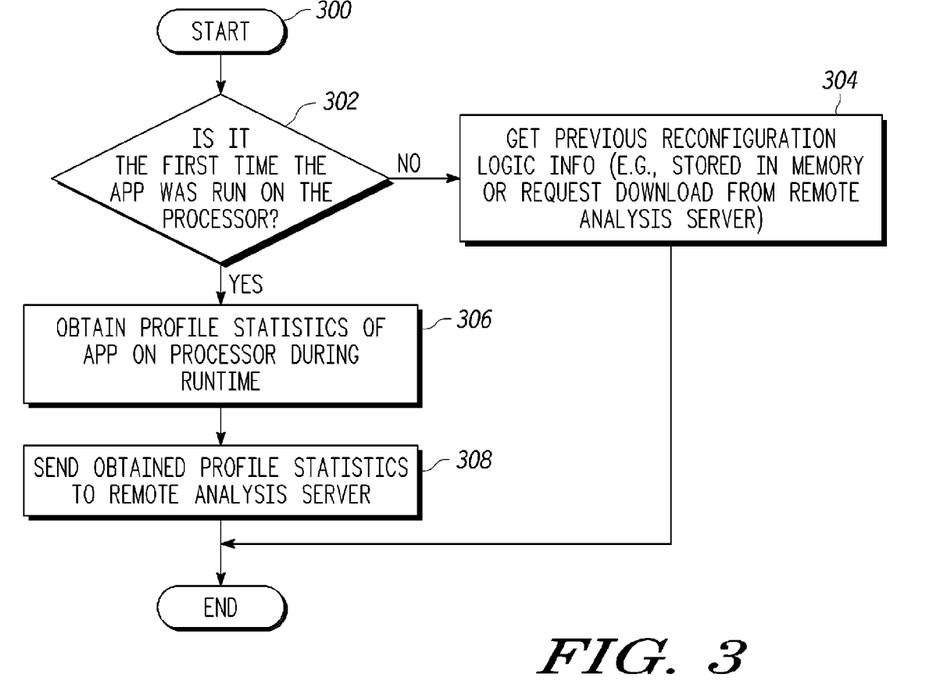
FIG. 3 is a block diagram illustrating one example of a method for reconfiguring a remote device in accordance with one embodiment of the invention.

FIG. 3 illustrates one example of a method for reconfiguring the device 102 that includes at least a processor and reconfigurable logic that is operatively coupled to the processor. This may be carried out, for example, by the subsystem 108, or any other suitable structure as desired. As shown in block 300, the method starts by, for example, the application profiler 206 determining that an application is running on the processor 200. This may be done by any suitable mechanism such as monitoring of an operating system call indicating that an application is about to be run, or in any other suitable manner. As shown in block 302, the method includes determining if it is the first time the application was run on the processor. This may be done, for example, by the application profiler 206 keeping a log of each application that has previously been profiled. As shown in block 304, if it is not the first time that the application is run on the processor, the application profiler 206 may obtain previous reconfiguration logic information to again, enhance the operation of the device. This previous reconfiguration logic information may be stored in memory 204. Alternatively, the application profiler 206 may send a request to download a previously sent reconfiguration reconfigurable information 122 and corresponding application patch 124 from the remote server 104.

However, if it is the first time the application was run on the processor, as shown in block 306, the method includes obtaining application runtime profile statistic information during runtime of the application. This may be done, for example, by circuits that monitor the instruction and data buses of the executing processor and may be done when the application is first run on the device or may be repeated if desired. There are other known methods for acquiring such statistics. This application profile statistic information 120 is then sent to the remote profile server as shown in block 308. The application profiler 206 may serve as a type of background program that monitors user behavior and operational characteristics of an executable program during runtime of a program. The application profiler 206, for example, may utilize any suitable known techniques for determining whether or not the captured statistics are significant. The profiler may generate top-executor or top-accesses lists from the raw profile statistics. Post-processing the raw data in this fashion can reduce the bandwidth required to send the profile information to the remote server. For example, in many current video codecs, 90 percent of the executed instructions are limited to 5-10 percent of the total codec application code. The sending of the application runtime profile statistic information 120 allows the remote profile server 104 to determine suitable reconfigurable logic configuration information 122 and corresponding application patch information 124. Once the information is received by the device, the device can then configure the reconfigurable logic 202 in response to the received reconfigurable logic configuration information 122 and can apply the application patch 124 provided by the remote profile server 104 to the application software running on the processor. As such, the device via the transceiver, receives reconfigurable logic configuration information 122 for the reconfigurable logic 202 from the remote profile server (e.g. analyzer) 104 that is based on the sent application runtime profile statistic information and also receives the application patch 124 for the processor 200 from the remote profile analyzer 130 that is based on the sent application runtime profile statistic information.

Figure 4:
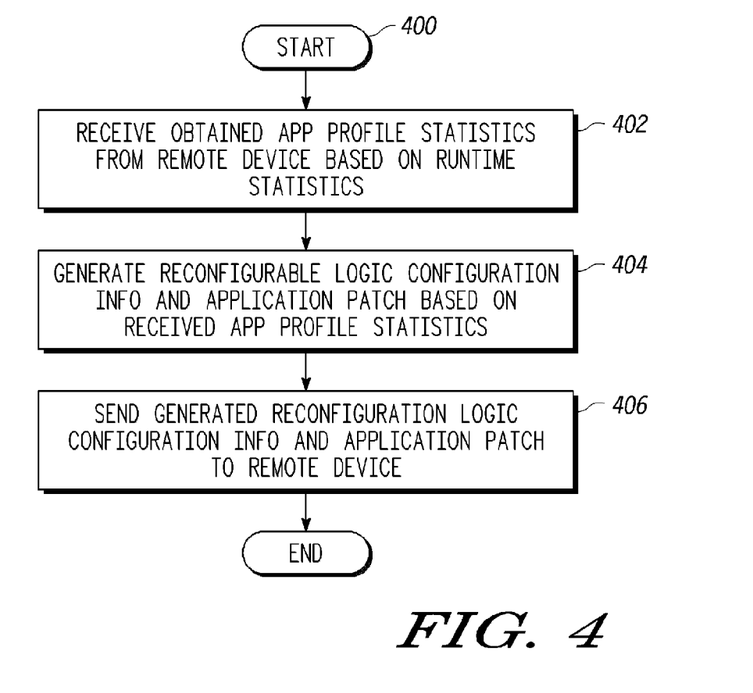
FIG. 4 is a block diagram illustrating one example of a method for reconfiguring a remote device in accordance with one embodiment of the invention.

FIG. 4 illustrates one example of a method for reconfiguring a device wherein the device includes at least a processor and reconfigurable logic taken from the perspective of the remote analysis server. As shown in block 400, the method includes, for example, the profile analyzer 130 having information regarding registered client devices that utilize the service. As shown in block 402, the method includes receiving the obtained application profile statistic information 120 from the remote device 102. In response, the remote profile analyzer 130 generates the reconfigurable logic configuration information, such as by obtaining it from a suitable lookup table or determining suitable reconfiguration logic information along with the suitable application patch based on the received application profile statistics as shown in block 404. As shown in block 406, the method includes sending the generated reconfiguration logic configuration information 122 and corresponding application patch 124 to the remote device so that the remote device can then implement the updates to the reconfigurable logic and employ the new application patch to enhance the operation of the remote device.

Figure 5:
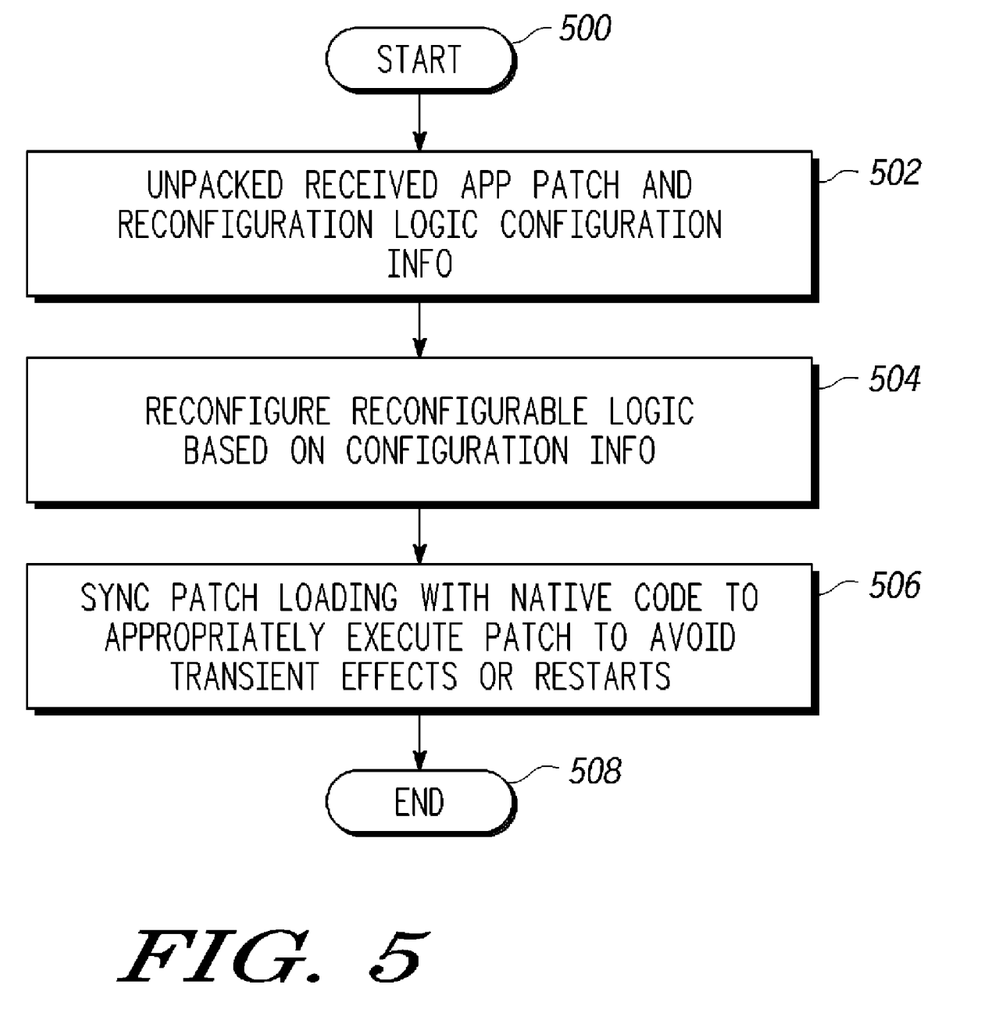
FIG. 5 is a block diagram illustrating one example of a method for reconfiguring a remote device in accordance with one embodiment of the invention.

FIG. 5 illustrates another example of a method for reconfiguring a remote device through the perspective of the reconfiguration logic manager 208. As shown in block 500 for example, the reconfiguration manager 208 receives the reconfigurable logic configuration information 122 and corresponding application patch information 124 from the transceiver and as shown in block 502, unpacks the received application patch and reconfiguration logic configuration information so that it can suitably carry out the reconfiguration process of the device. As shown in block 504, the reconfiguration manager 208 reconfigures the reconfigurable logic 202 based on the received reconfigurable logic configuration information which may be for example, a configuration file for a field programmable gate array. As shown in block 506, the reconfiguration manager 208 may synchronize application patch loading with the native code to appropriately execute the application patch to avoid transient effects or restarts of the system as desired. As shown in block 508, the method may then continue to update the device as desired based on new application profile statistic information 120 obtained by the application profiler.

Referring back to FIG. 1, the remote profile server 104 utilizes the communication interface 116 to receive the application runtime profile statistic information 120 sent by the remote device 102. The profile analyzer 130 analyzes the received application runtime profile statistic information to determine the suitable reconfigurable logic configuration information 122 and corresponding application patch information 124 for the remote device. The communication interface then sends the determined reconfiguration logic configuration information 122 and corresponding application patch information 124 for the remote device. In one example, the reconfigurable logic configuration information 122 and corresponding application patch information 124 may reduce power consumption of the remote device when the remote device is reconfigured using the reconfigurable logic configuration information and application patch. The reconfigurable logic configuration information 122 may take any suitable form but in one example, includes data representing a field programmable gate array configuration file. Similarly, the application patch information 124 may also take any suitable form but in one embodiment, includes data representing executable code that is executable by the processor 200 such as a new version of a native application that is running or a suitable module that may be integrated with the native application so that the native application calls the new application patch to facilitate enhanced remote device operation.

As noted above, among other advantages, the disclosed system allows a remote client device that includes reconfigurable circuit logic to collect application execution profiling information and communicate the information to a remote server. The server may analyze the profile information and create a new design for the remote device by creating or obtaining binary kernels, for example, of the software application and also configuration files for reconfigurable logic to update the client device. The usage of distributed computational resources may allow for an improved range of design updates for a client device. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. An apparatus for reconfiguring a remote device that includes a processor and reconfigurable logic operatively coupled to the processor, the apparatus comprising:

a communication interface operative to receive collected application runtime profile statistic information associated with the remote device that was obtained during runtime of an application running on the processor of the remote device by running the application and collecting statistic information on the application as a result of the application running;

profile analyzer operative to analyze the received collected application runtime profile statistic information to determine suitable reconfigurable logic configuration information for the reconfigurable logic of the remote device and corresponding application patch information for the processor of the remote device; and the communication interface operative to send the reconfiguration logic configuration information and the corresponding application patch information for the remote device.

2. The apparatus of claim 1 wherein the reconfigurable logic configuration information comprises data representing a field programmable gate array configuration file and wherein the corresponding application patch information comprises data representing executable code.

3. The apparatus of claim 1 wherein the communication interface is operatively coupled to a wireless network and wherein the profile analyzer is comprised of a processor that executes instructions.

4. The apparatus of claim 1 wherein the communication interface is operative to receive the collected application runtime profile statistic information that represents at least one of: a number of times particular instructions are executed, or a number of times particular memory locations are accessed, or a number of times particular memory location sequences are accessed, or a number of loop executions that occur, or a structure of loop executions of the application.

5. An apparatus comprising:

a remote device comprising:

a processor;

reconfigurable logic operatively coupled to the processor;

memory, operatively coupled to the processor, containing executable instructions that serve as an application;

an application profiler operative to produce at least application runtime profile statistic information during runtime of the application running on the processor by running the application and collecting statistic information on the application as a result of the application running; and a communication interface operatively coupled to the application profiler and operative to transmit the collected application runtime profile statistic information for a remote profile server and to receive reconfigurable logic configuration information for the reconfigurable logic of the remote device and corresponding application patch information sent by the processor of the remote profile server.

6. The apparatus of claim 5 wherein the reconfigurable logic configuration information and corresponding application patch information improves remote device performance by at least either causing reduced power consumption of the remote device or improving processing speed of a processor in the remote device when the remote device is reconfigured using the reconfigurable logic configuration information and corresponding application patch.

7. The apparatus of claim 5 wherein the processor executes instructions to serve as the application profiler.

8. The apparatus of claim 5 further comprising a reconfiguration manager operatively coupled to the communication interface and to the reconfigurable logic and operative to at least reconfigure the reconfigurable logic based on the received reconfigurable logic configuration information.

9. The apparatus of claim 8 wherein the reconfiguration manager is operative to facilitate loading of the corresponding application patch information to update the application based on the sent collected application runtime profile statistic information.

10. The apparatus of claim 5 comprising a profile server that comprises:

a communication interface operative to receive collected application runtime profile statistic information associated with the remote device that was obtained during runtime of an application miming on the processor of the remote device;

profile analyzer operative to analyze the received collected application runtime profile statistic information to determine suitable reconfigurable logic configuration information and corresponding application patch information for the remote device; and the communication interface operative to send the reconfiguration logic configuration information and the corresponding application patch information for the remote device.

11. The apparatus of claim 10 wherein the processor executes instructions and serves as the application profiler.

12. The apparatus of claim 5 wherein the device comprises a cell phone.

13. The apparatus of claim 12 wherein the communication interface is operatively coupled to a wireless network.

14. The apparatus of claim 5 wherein the application profiler is operative to produce at least application runtime profile statistic information that represents at least one of: a number of times particular instructions are executed, or a number of times particular memory locations are accessed, or a number of times particular memory location sequences are accessed, or a number of loop executions that occur, or a structure of loop executions of the application.

15. A method for reconfiguring a device comprising:
obtaining application runtime profile statistic information during runtime of an application running on a processor by running the application and collecting statistic information on the application as a result of the application running;

sending the collected application runtime profile statistic information to a remote profile analyzer; and configuring reconfigurable logic in response to received reconfigurable logic configuration information and employing an application patch by the processor, in response to a received application patch, provided by the remote profile analyzer based on the sent collected application runtime profile statistic information.

16. The method of claim 15 wherein the method comprises:

receiving reconfigurable logic configuration information for the reconfigurable logic from the remote profile analyzer that is based on the sent collected application runtime profile statistic information; and receiving an application patch for the processor from the remote profile analyzer that is based on the sent collected application runtime profile statistic information.

17. The method of claim 15 wherein configuring the reconfigurable logic in response to received reconfigurable logic configuration information and employing an application patch by the processor, in response to a received application patch, provided by the remote profile analyzer causes the processor to at least one of: enhance speed of processing of the processor and reduce power consumption of the processor.

18. The method of claim 15 comprising:

receiving collected application runtime profile statistic information associated with the remote device that was obtained during runtime of an application running on the processor;

analyzing the received collected application runtime profile statistic information to determine suitable reconfigurable logic configuration information and corresponding application patch information for the remote device; and sending the reconfiguration logic configuration information and the corresponding application patch information to the remote device.

19. The method of claim 15 wherein sending the reconfiguration logic configuration information and the corresponding application patch information to the remote device comprises sending the reconfiguration logic configuration information and the corresponding application patch information via a wireless network.

20. The method of claim 19 wherein sending the collected application runtime profile statistic information to the remote profile analyzer comprises wirelessly sending the application runtime profile statistic information to the remote profile analyzer.

21. The method of claim 15 wherein the reconfiguration logic configuration information comprises configuration information for a field programmable gate array.

22. The method of claim 15 comprising executing instructions to serve as an application profiler.

23. The method of claim 15 wherein obtaining application runtime profile statistic information comprises obtaining at least one of: a number of times particular instructions are executed, or a number of times particular memory locations are accessed, or a number of time particular memory location sequences are accessed, or a number of loop executions that occur, or a structure of loop executions of the application.

* * * * *